(12) United States Patent
Nagata et al.

(10) Patent No.: US 8,078,366 B2
(45) Date of Patent: Dec. 13, 2011

(54) SEAT CONTROL DEVICE

(75) Inventors: Tatsuki Nagata, Utsunomiya (JP); Toshihiro Kawakami, Utsunomiya (JP)

(73) Assignee: OMRON Corporation, Kyoto (JP)

( * ) Notice: Subject to any disclaimer, the term of this patent is extended or adjusted under 35 U.S.C. 154(b) by 402 days.

(21) Appl. No.: 12/469,518

(22) Filed: May 20, 2009

(65) Prior Publication Data

US 2009/0292425 A1 Nov. 26, 2009

(30) Foreign Application Priority Data

May 20, 2008 (JP) ................. 2008-131944

(51) Int. Cl.
*G06F 7/00* (2006.01)
*G05D 3/00* (2006.01)
(52) U.S. Cl. .......................... 701/49; 180/273
(58) Field of Classification Search ............ 701/49; 180/273
See application file for complete search history.

(56) References Cited

U.S. PATENT DOCUMENTS

| | | | |
|---|---|---|---|
| 4,797,824 A * | 1/1989 | Sugiyama et al. | 701/49 |
| 4,807,934 A * | 2/1989 | Sakakibara et al. | 297/403 |
| 4,811,226 A * | 3/1989 | Shinohara | 701/49 |
| 5,003,240 A * | 3/1991 | Ikeda | 318/603 |
| 5,136,221 A * | 8/1992 | Takizawa et al. | 318/567 |
| 6,341,252 B1 * | 1/2002 | Foo et al. | 701/45 |
| 6,490,515 B1 * | 12/2002 | Okamura et al. | 701/49 |
| 7,779,956 B2 * | 8/2010 | Breed et al. | 180/273 |
| 2007/0289800 A1 * | 12/2007 | Aoki et al. | 180/273 |

FOREIGN PATENT DOCUMENTS

| | | |
|---|---|---|
| JP | 61-115735 | 7/1986 |
| JP | 4-72032 | 6/1992 |
| JP | 6-28998 | 4/1994 |
| JP | 2542578 | 4/1997 |

* cited by examiner

*Primary Examiner* — Toan To
(74) *Attorney, Agent, or Firm* — Osha • Liang LLP

(57) ABSTRACT

A seat control device has an input unit for performing at least one of an operation to incline and move a first seat, and a drive control unit for at least one of inclining and moving the first seat based on an output of the input unit. The seat control device has an open/close detection unit for detecting an opened or closed state of a door for getting on and off to and from the first seat, an angle detection unit for detecting an angle of a backrest of the first seat; and a seating detection unit for detecting presence/absence of seating at a second seat positioned behind the first seat. When the open/close detection unit detects that the door is in the opened state, the angle detection unit detects an angle of a backrest of the first seat. When the detected angle is larger than a predetermined angle, the seating detection unit detects the presence or absence of seating at the second seat. The drive control unit is driven based on the detection of absence of seating to return the backrest of the first seat to an original orientation.

16 Claims, 9 Drawing Sheets

SEAT CONTROL DEVICE

BACKGROUND OF THE INVENTION

1. Technical Field

The present invention relates to a seat control device for controlling an angle of a backrest of a seat arranged inside a vehicle and/or a horizontal position of the seat.

2. Related Art

Most seats arranged in a vehicle such as an automobile include a seat control device for inclining a backrest of the seat forward or backward and moving the seat in a horizontal direction for every seat.

Thus, in a front seat and a back seat in a front-back relationship with each other, for example, when a passenger gets on and off or when loading and unloading a baggage to and from the back seat, the backrest of the front seat is inclined forward or the relevant back seat is horizontally moved forward by the seat control device so that the passenger can easily get on and off or the baggage can be easily loaded and unloaded with respect to the back seat.

Similarly, when the passenger gets on and off or when loading and unloading the baggage to and from the front seat, the back seat of the front seat is inclined backward or the relevant front seat is horizontally moved backward by the seat control device so that the passenger can easily get on and off or the baggage can be easily loaded and unloaded with respect to the front seat.

Japanese Utility Model Publication No. 2542578 discloses a movement device of a passenger seat of a two-door vehicle configured to detect whether or not a passenger is riding on a passenger seat, and stop the passenger seat at a predetermined position on a back side than a front end position when an operation of moving the passenger seat forward is performed with the passenger riding on the passenger seat, and stop the passenger seat at the front end position when an operation of moving the passenger seat forward is performed without the passenger riding on the passenger seat.

Japanese Examined Patent Publication No. 6-28998 discloses a vehicle seat adjustment device configured to detect whether a passenger is present at the back seat, detect whether the door on the passenger seat side is opened, and incline the backrest of the passenger seat forward and move the passenger seat to a predetermined position on a front side when detecting that the passenger is not present at the passenger seat.

Japanese Unexamined Utility Model Publication No. 4-72032 discloses a passenger seat device configured to detect whether the passenger is present at the back seat, and automatically move the passenger seat forward and/or automatically incline the head rest forward when detecting that the passenger is not at the passenger seat.

Japanese Unexamined Utility Model Publication No. 61-115735 discloses a control device including a switch device for stopping the movement of a driver seat at a position operable by a person seated at the back seat of the driver seat.

SUMMARY

For example, in a two-door automobile without a back door, a passenger of a back seat can easily get off by inclining a backrest of a front seat forward when getting off from a door next to the front seat, but it is inconvenient if the backrest of the front seat remains in the forward-inclined state even after the passenger got off. Furthermore, when unloading a large baggage and the like from the front seat, the baggage and the like can be easily unloaded by inclining the backrest of the front seat backward, but it is also inconvenient if the backrest of the front seat remains in the backward-inclined state. A seat control device needs to be operated to return the inclined backrest to an original position, but this is troublesome to the passenger. This may also be the case when the front seat is moved forward or backward.

One or more embodiments of the present invention provides a seat control device capable of returning the angle of the back seat of the seat and the position of the seat without requiring the operation of the passenger.

In accordance with one aspect of the present invention, a seat control device includes an input unit for performing an operation to incline and/or move a first seat; and a drive control unit for inclining and/or moving the first seat based on an output of the input unit. The seat control device is provided with: an open/close detection unit for detecting an opened/closed state of a door for getting on and off to and from the first seat; an angle detection unit for detecting an angle of a backrest of the first seat; and a seating detection unit for detecting presence/absence of seating at a second seat positioned behind the first seat.

When detected that the door is in the opened state by the open/close detection unit, an angle of a backrest of the first seat is detected by the angle detection unit, and when the detected angle is beyond a predetermined angle, the presence/absence of seating at the second seat is detected by the seating detection unit. The drive control unit is driven based on the detection of absence of seating to return the backrest of the first seat to an original position.

Thus, when the angle of the backrest of the first seat exceeds a predetermined angle and seating is absent at the second seat, the backrest can be automatically returned to the original orientation by the drive control unit without requiring the operation by the passenger.

In the seat control device according to one or more embodiments of the present invention, when absence of seating is detected by the seating detection unit, whether or not the door is closed is detected by the open/close detection unit, and the drive control unit may be driven based on the detection of the closed state of the door to return the backrest of the first seat to the original orientation.

Thus, the backrest can be automatically returned to the original orientation at the time point the passenger of the back seat got off from the vehicle and the closed state of the door is confirmed.

The seat control device according to one or more embodiments of the present invention includes a lock detection unit for detecting presence/absence of lock of the door, and when absence of seating is detected by the seating detection unit, whether or not the door is locked is detected by the lock detection unit, and the drive control unit may be driven based on the detection of the lock of the door to return the backrest of the first seat to the original position.

Thus, the backrest can be automatically returned to the original orientation at the time point the passenger of the back seat got off from the vehicle and the locked state of the door is confirmed.

The seat control device according to one or more embodiments of the present invention includes a timing unit for timing time, and when absence of seating is detected by the seating detection unit, timing by the timing unit is started, and the drive control unit may be driven based on the time timed by the timing unit exceeding a predetermined time to return the backrest of the first seat to the original position.

Thus, the backrest can be automatically returned to the original position at the time point the time necessary for the passenger of the back seat to get off from the vehicle after standing up from the seat has elapsed.

The seat control device according to the present includes a storage unit for storing the angle of the backrest of the first seat when detected that the door is in the opened state by the open/close detection unit, and when returning the backrest of the first seat to the original position, the backrest may be returned so that the angle of the backrest of the first seat becomes the angle stored in the storage unit.

Thus, when the backrest is returned to the original orientation, the angle of the backrest can be made to the same angle as the angle of when the door is opened.

The seat control device according to one or more embodiments of the present invention includes a position detection unit for detecting a horizontal position of the first seat in place of the angle detection unit, and when detected that the door is in the opened state by the open/close detection unit, a horizontal position of the first seat is detected by the position detection unit, when the detected position is beyond a predetermined position, the presence/absence of seating at the second seat is detected by the seating detection unit, and the drive control unit may be driven based on the detection of absence of seating to return the first seat to an original position.

Thus, when the first seat is at a position beyond a predetermined position and the seating at the second seat is absent, the first seat can be automatically returned to the original position by the drive control unit without requiring the operation by the passenger.

In the seat control device according to one or more embodiments of the present invention, when absence of seating is detected by the seating detection unit, whether or not the door is in the closed state is detected by the open/close detection unit, and the drive control unit may be driven based on the detection of the closed state of the door to return the first seat to the original position.

Thus, the backrest can be automatically returned to the original orientation at the time point the passenger of the back seat got off from the vehicle and the closed state of the door is confirmed.

The seat control device according to one or more embodiments of the present invention includes a lock detection unit for detecting presence/absence of lock of the door, and when absence of seating is detected by the seating detection unit, whether or not the door is locked is detected by the lock detection unit, and the drive control unit may be driven based on the detection of the lock of the door to return the first seat to the original position.

Thus, the first seat can be automatically returned to the original position at the time point the passenger of the back seat got off from the vehicle and the locked state of the door is confirmed.

The seat control device according to one or more embodiments of the present invention includes a timing unit for timing time, and when absence of seating is detected by the seating detection unit, timing by the timing unit is started, and the drive control unit may be driven based on the time timed by the timing unit exceeding a predetermined time to return the first seat to the original position.

Thus, the first seat can be automatically returned to the original position at the time point the time necessary for the passenger of the back seat to get off from the vehicle after standing up from the seat has elapsed.

The seat control device according to one or more embodiments of the present invention includes a storage unit for storing a horizontal position of the first seat when detected that the door is in the opened state by the open/close detection unit, and when returning the first seat to the original position, the first seat may be returned to the position stored in the storage unit.

Thus, when the first position is returned to the original position, the position of the first seat can be made to the same position of when the door is opened.

According to one or more embodiments of the present invention, the inclined backrest can be automatically returned to the original orientation and the moved seat can be automatically returned to the original position without requiring the operation by the passenger, thereby enhancing convenience.

DETAILED DESCRIPTION

Hereinafter, embodiments of the present invention will be described with reference to the drawings.

In FIGS. 1 to 9 described below, same reference symbols are denoted for the same or corresponding portions.

Figure 1:
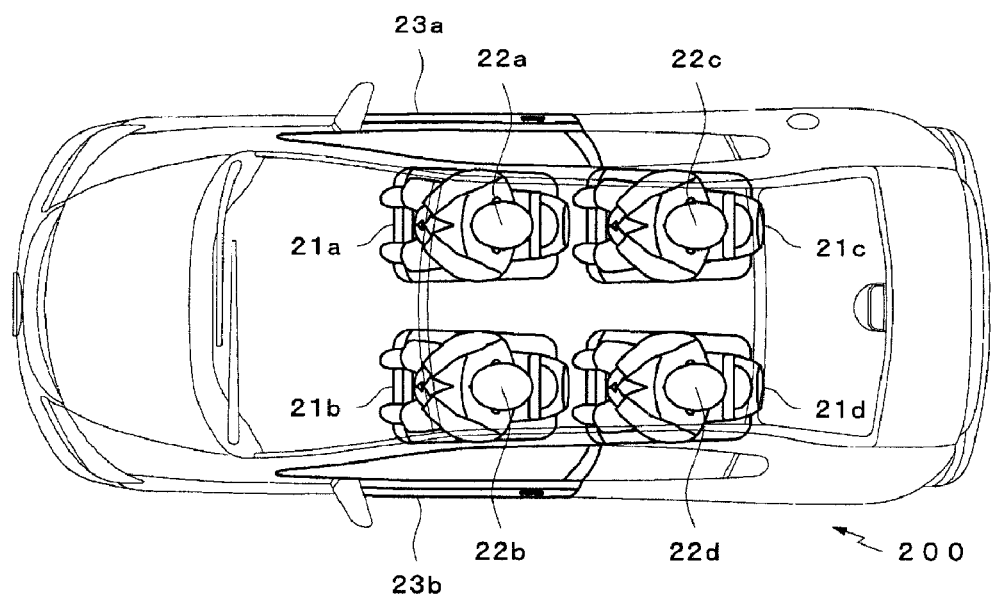
FIG. 1 is a view showing a vehicle applied with one or more embodiments of the present invention.

FIG. 1 is a view showing a vehicle 200 applied with a seat control device according to one or more embodiments of the present invention.

In the figure, reference symbols 21a and 21b denote seats arranged in a first row, 21c denotes a seat of a second row arranged behind the seat 21a, and 21d denotes a seat of a second row arranged behind the seat 21b.

Reference symbol 22a denotes a passenger seated at the seat 21a, 22b denotes a passenger seated at the seat 21b, 22c denotes a passenger seated at the seat 21c, and 22d denotes a passenger seated at the seat 21d.

Reference symbol 23a denotes a door for getting on and off to the seat 21a and/or the seat 21c, and 23b denotes a door for getting on and off to the seat 21b and/or the seat 21d.

Specifically, the passenger 22a and the passenger 22c mainly get on and off from the door 23a, and the passenger 22b and the passenger 22d mainly get on and off from the door 23b. The passenger may get on and off to the seat 21d from the door 23a, and similarly, get on and off to the seat 21c from the door 23b.

Figure 2:
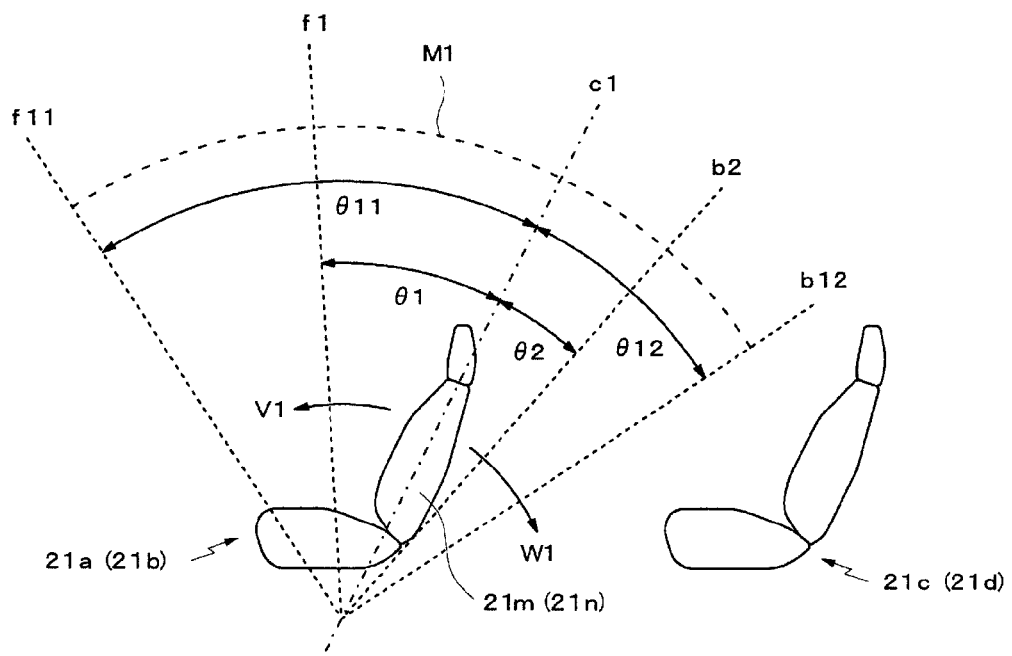
FIG. 2 is a view showing one example of a positional relationship of a front row seat and a back row seat arranged in a compartment of the vehicle and an inclination range of the backrest of the front seat.

As shown in FIG. 2, the seats 21a and 21b are arranged with the backrest inclinable and the seats 21c and 21d are arranged with the backrest fixed in the compartment of the vehicle 200, as shown in the figure. Note that the term "incline" in one or more embodiments of the present invention means that the backrest moves to incline forward or backward with a supporting point at the lower part as the center.

In FIG. 2, reference symbol 21m denotes the backrest of the seat 21a, 21n denotes the backrest of the seat 21b, V1 denotes an inclining direction to the front side of the backrests 21m and 21n, and W1 denotes an inclining direction to the back side of the backrests 21m and 21n.

Moreover, reference symbol c1 denotes a suitable position of the backrest 21m of the seat 21a and the backrest 21n of the seat 21b in the compartment of the vehicle 200 (FIG. 1), where the backrests 21m and 21n are normally at such a position. In other words, c1 is a reference position of the backrests 21m and 21n.

Reference symbol θ1 denotes an inclination allowable angle (hereinafter referred to as "forward allowable angle") of the backrests 21m and 21n in the V1 direction, and θ2 denotes an inclination allowable angle (hereinafter referred to as "backward allowable angle") of the backrests 21m and 21n in the W1 direction. Specifically, θ1 indicates the angle from position c1 to position f1, and θ2 indicates the angle from position c1 to position b2. Note that the allowable angle referred to herein means a maximum angle at which the passengers 22a and 22b can naturally sit on the seats 21a and 21b.

Reference symbol θ11 denotes an inclination limit angle (hereinafter referred to as "forward limit angle") of the backrests 21m and 21n in the V1 direction, and θ12 denotes an inclination limit angle (hereinafter referred to as "backward limit angle") of the backrests 21m and 21n in the W1 direction. Specifically, θ11 indicates an angle from position c1 to position f11, and θ12 indicates an angle from position c1 to position b12. Note that the limit angle referred to herein means the angle at which the backrests 21m and 21n can be no further inclined in terms of mechanism.

Reference symbol M1 represents the range (hereinafter referred to as "inclination range") from position f11 to position b12, and backrests 21m and 21n can be inclined within the inclination range M1 (i.e., in a range of θ11+θ12). The inclination angle is in a range of 0 to θ11 if the backrests 21m and 21n are inclined forward (V1 direction) from position c1, and the inclination angle is in the range of 0 to θ12 if the backrests 21m and 21n are inclined backward (W1 direction) from position c1.

Figure 3:
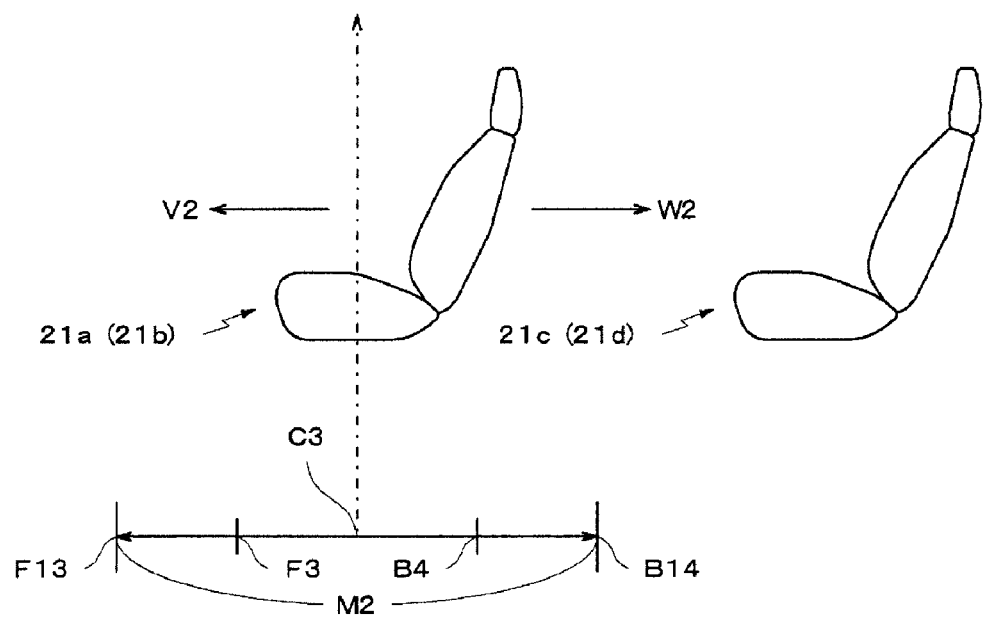
FIG. 3 is a view showing one example of a positional relationship of a front row seat and a back row seat arranged in a compartment of a vehicle and a movement range of the front row seat.

As shown in FIG. 3, the seats 21a and 21b are arranged in the compartment of the vehicle 200 so as to be horizontally movable, and the seats 21c and 21d are arranged in the compartment of the vehicle 200 in a fixed state, as shown in the figure.

In FIG. 3, reference symbol V2 denotes a forward-movement direction of the seats 21a and 21b in the horizontal movement, and W2 denotes a backward-movement direction of the seats 21a and 21b in the horizontal movement.

Reference symbol F3 denotes a forward-movement allowable position (hereinafter referred to as "forward allowable position") of the seats 21a and 21b in the V2 direction, and B4 denotes a backward-movement allowable position (hereinafter referred to as "backward allowable position") of the seats 21a and 21b in the W2 direction. Note that the allowable position referred to herein is a maximum position the passengers 22a and 22b can naturally seat on the seats 21a and 21b.

Reference symbol F13 denotes a forward-movement limit position (hereinafter referred to as "front end position") of the seats 21a and 21b in the V2 direction, and B14 denotes a backward-movement limit position (hereinafter referred to as "back end position") of the seats 21a and 21b in the W2 direction. The limit position referred to herein is the position the seats 21a and 21b cannot move any further in terms of mechanism.

Reference symbol M2 denotes a range from the front end position F13 to the back end position B14 (hereinafter referred to as "movement range"), and the seats 21a and 21b are movable within the movement range M2. Reference symbol C3 denotes a center position in the movement range M2, and center position C3 is the suitable position of the seats 21a and 21b in the compartment of the vehicle 200. The seats 21a and 21b are normally at such position C3. In other words, C3 is the reference position of the seats 21a and 21b.

In the embodiment described below, when the front seat is the seat 21a the back seat is the seat 21c, and when the front seat is the seat 21b the back seat is the seat 21d. Thus, the seats 21a and 21b configure one embodiment of a first seat in one or more embodiments of the present invention, and the seats 21c and 21d configure one embodiment of a second seat in one or more embodiments of the present invention.

The doors 23a and 23b configure one embodiment of a door for getting on and off to and from the first seat in one or more embodiments of the present invention, and the backrests 21m and 21n configure one embodiment of a backrest of the first seat in one or more embodiments of the present invention.

The angle θ1 corresponds to a "predetermined angle" when the backrest is inclined forward in one or more embodiments of the present invention, and the angle θ2 corresponds to a "predetermined angle" when the backrest is inclined backward in one or more embodiments of the present invention.

Figure 4:
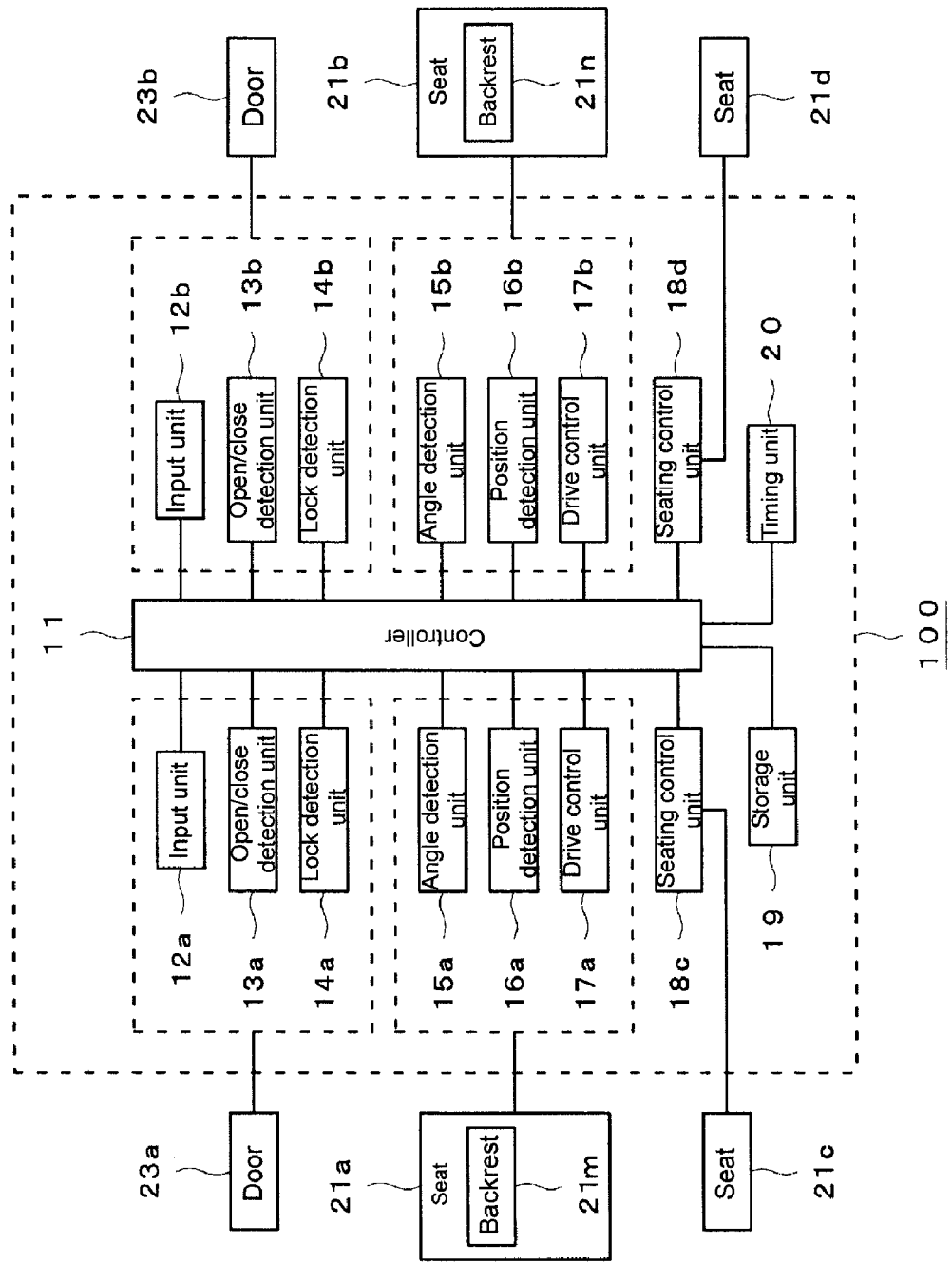
FIG. 4 is a block diagram showing a seat control device according to an embodiment of the present invention.

The position F3 corresponds to a "predetermined position" when the first seat is moved forward in one or more embodiments of the present invention, and the position B4 corresponds to a "predetermined position" when the first seat is moved backward in one or more embodiments of the present invention FIG. 4 is a block diagram showing one embodiment of a seat control device according to one or more embodiments of the present invention.

In the figure, reference symbol 100 denotes a seat control device for controlling the seats 21a and 21b, where the seat control device 100 includes a controller 11, input units 12a and 12b, open/close detection units 13a and 13b, lock detection units 14a and 14b, angle detection units 15a and 15b, position detection units 16a and 16b, drive control units 17a and 17b, seating detection units 18a and 18b, a storage unit 19, and a timing unit 20.

The controller 11 includes a CPU (Central Processing Unit) and the like, and controls each unit of the seat control device 100 in an integrated manner.

The input units 12a and 12b (hereinafter collectively denoted as reference symbol 12) include a switch and the like of a shape shown in FIG. 5, and are arranged on the inner side of the doors 23a and 23b, respectively.

Figure 5:
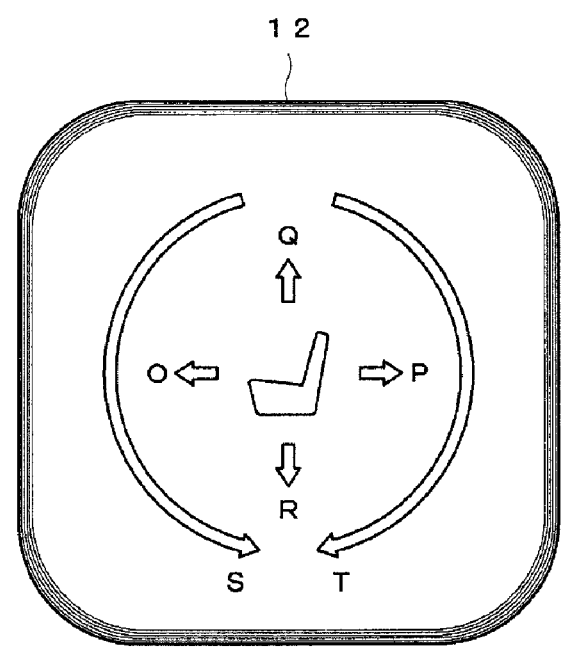
FIG. 5 is a view showing one example of an input unit.

In FIG. 5, O to T are operation directions of the input unit 12 set by control, where the input unit 12 is turned in the S direction when inclining the backrest of the seat in the V1 direction (FIG. 2), and is turned in the T direction when inclining the backrest in the W1 direction (FIG. 2).

The input unit 12 is pushed in the O direction when moving the seat forward in the V2 direction (FIG. 3), and pushed in the P direction when moving the seat backward in the W2 direction (FIG. 3). Furthermore, the input unit 12 is pushed in the Q direction when perpendicularly moving the seat upward, and pushed in the R direction when perpendicularly moving the seat downward. Note that the pushing directions Q and R are irrelevant to one or more embodiments of the present invention, and thus the description thereof will not be given.

An operation of controlling the seat 21a (e.g., inclination of backrest and horizontal movement of seat) is performed with the input unit 12a, and an operation of controlling the seat 21b is performed with the input unit 12b. The input units 12a and 12b thus configure one embodiment of an input unit in one or more embodiments of the present invention.

The open/close detection units 13a and 13b include an open/close sensor (not shown) and the like. The open/close detection unit 13a detects whether or not the door 23a is in the closed state, and the open/close detection unit 13b detects whether or not the door 23b is in the closed state. The open/close detection units 13a and 13b thus configure one embodiment of an open/close detection unit in one or more embodiments of the present invention.

The lock detection units 14a and 14b include a switch and the like. The lock detection unit 14a detects whether or not the door 23a is locked, and the lock detection unit 14b detects whether or not the door 23b is locked. The lock detection units 14a and 14b thus configure one embodiment of a lock detection unit in one or embodiments of the present invention.

The angle detection units 13a and 13b include an angle sensor (not shown) and the like. The angle detection unit 13a sequentially detects the angle (angle from c1) of the backrest within the inclination range M1 (FIG. 2) when the backrest 21m is inclined in the V1 or the W1 direction, and the angle detection unit 13b sequentially detects the angle (angle from c1) of the backrest within the inclination range M1 when the backrest 21n is inclined in the V1 or the W1 direction. The angle detection units 15a and 15b thus configure one embodiment of the angle detection unit in one or more embodiments of the present invention.

The position detection units 16a and 16b include a position sensor (not shown) and the like. The position detection unit 16a sequentially detects the position (distance from C3) of the seat within the movement range M2 (FIG. 3) when the seat 21a is moved in the V2 or the W2 direction, and the position detection unit 16b sequentially detects the position (distance from C3) of the seat within the movement range M2 when the seat 21b is moved in the V2 or the W2 direction. The position detection units 16a and 16b thus configure one embodiment of a position detection unit in one or more embodiments of the present invention.

The drive control units 17a and 17b include an electronic motor (not shown) and the like. The drive control unit 17a inclines the backrest 21m in the V1 or the W1 direction, or moves the seat 21a forward or backward in the V2 or the W2 direction based on the output of the input unit 12a. Similarly, the drive control unit 17b inclines the backrest 21b in the V1 or the W1 direction, or moves the seat 21b forward or backward in the V2 or the W2 direction based on the output of the input unit 12b. The drive control units 17a and 17b thus configure one embodiment of a drive control unit in one or more embodiments of the present invention.

The seating detection units 18a and 18b include a pressure sensor (not shown) and the like. An optical sensor, an imaging device (camera), and the like may be used in place of the pressure sensor. The seating detection unit 18c detects whether or not the seat 21c is seated, and the seating detection unit 18d detects whether or not the seat 21d is seated. The seating detection units 18a and 18b thus configure one embodiment of the seating detection unit in one or more embodiments of the present invention.

The storage unit 19 includes an EEPROM (Electronically Erasable and Programmable Read Only Memory) and the like. If detected that the doors 23a and 23b are in the opened state by the open/close detection units 13a and 13b, the angles (angle from c1) of the backrests 21m and 21n at the time of detection is stored in the storage unit 19. The storage unit 19 thus configures one embodiment of a storage unit in one or more embodiments of the present invention.

The timing unit 20 includes a timer (not shown) and the like. The timing unit 20 starts timing from a time point the absence of seating at the seats 21c and 21d is detected by the seating detection units 18a and 18b. The timing unit 20 thus configures one embodiment of a timing unit in one or more embodiments of the present invention.

In the seat control device 100 of the present embodiment, for example, the passenger 22a (FIG. 1) operates the input unit 12a when inclining the backrest 21m of the seat 21a in the V1 or the W1 direction. Similarly, the passenger 22a operates the input unit 12a when horizontally moving the seat 21a in the V2 or the W2 direction. Note that when inclining the backrest 21n of the seat 21b in the V1 or the W1 direction, or when horizontally moving the seat 21b in the V2 or the W2 direction as well, the operation is similar to the backrest 21m and the seat 21a other than that the input unit is 12b, and thus the description thereof will not be given.

When the passenger 22a turns the input unit 12a in the S direction (hereinafter referred to as "forward inclination direction") of FIG. 3, the backrest 21m is inclined in the V1 direction within the inclination range M1, and when the passenger 22a turns the input unit 12a in the T direction (hereinafter referred to as "backward inclination direction") of FIG. 3, the backrest 21m is inclined in the W1 direction within the inclination range M1.

When the passenger 22a pushes the input unit 12a in the O direction (hereinafter referred to as "forward") of FIG. 3, the seat 21a is moved forward in the V2 direction within the movement range M2, and when the passenger 22a pushes the input unit 12a in the P direction ("hereinafter referred to as "backward") of FIG. 3, the seat 21a is moved backward in the W2 direction within the movement range M2.

In a case of the present embodiment, an operation amount of the input unit is the turn angle or the pushing time in the predetermined direction with respect to the input unit. Thus, the backrest 21m inclines by a predetermined angle in the V1 or the W1 direction based on the turn angle, and the seat 21a moves by a predetermined distance in the V2 or the W2 direction based on the pushing time.

Thus, when the operation amount in inclining the backrest is large, that is, when the turn angle in the forward inclination direction at the input unit 12a is large, the backrest 21m is inclined beyond the forward allowable angle θ1, and when the turn angle in the backward inclination direction at the input unit 12a is large, the backrest 21m is inclined beyond the backward allowable angle θ2.

Similarly, when the operation amount in horizontally moving the seat is large, that is, when the pushing time towards the front side at the input unit 12a is long, the seat 21a is moved forward beyond the forward allowable position F3, and when the pushing time towards the back side at the input unit 12a is long, the seat 21a is moved backward beyond the backward allowable position B4.

When the passenger 22a inclines the backrest 21m beyond the forward allowable angle θ1 or the backward allowable angle θ2 after getting off from the vehicle 200, conventionally, the passenger him/herself needed to operate the input unit 12a to return the backrest 21m to an angle not exceeding the forward allowable angle θ1 or the backward allowable angle θ2.

Similarly, when the passenger 22a moves the seat 21a beyond the forward allowable position F3 or the backward allowable position B4 after getting off from the vehicle 200, conventionally, the passenger him/herself needed to operate the input unit 12a to return the seat 21a to a position not beyond the forward allowable position F3 or the backward allowable position B4.

In the seat control device 100 serving as an embodiment of the present invention, the seat control described below is performed to return the angle of the backrest (e.g., backrest 21m) of the seat to the front side and the position of the seat (e.g., seat 21a) to the front side without requiring the operation by the passenger (e.g., passenger 22a) in the two seats (e.g., seat 21a and seat 21c) in a front-back relationship to each other.

The operation of the seat control device (FIG. 4) serving as the embodiment of the present invention will now be described with reference to the drawings.

In the description below, only the control operation related to the two seats (e.g., seat 21a and seat 21c in FIG. 1) in the front-back relationship to each other will be described. The two seats (e.g., seat 21a and seat 21b in FIG. 1) in a parallel relationship, as well as the two seats (e.g., seat 21a and seat 21d in FIG. 1) not in the front-back relationship or the parallel relationship are irrelevant to the present invention, and thus the description thereof will not be given.

In the compartment of the vehicle 200 (FIG. 1), the seats in the front-back relationship to each other are the seat 21a and the seat 21c, as well as, the seat 21b and the seat 21d, where the operation of the seat control device 100 described below is the same in either case, and thus the control operation related to the seat 21b and the seat 21d will not be given in the following description.

(1) When Inclining Backrest of Front Seat

First, first to fourth examples of when inclining the backrest of the front seat will be described using a flowchart of FIG. 6.

Figure 6:
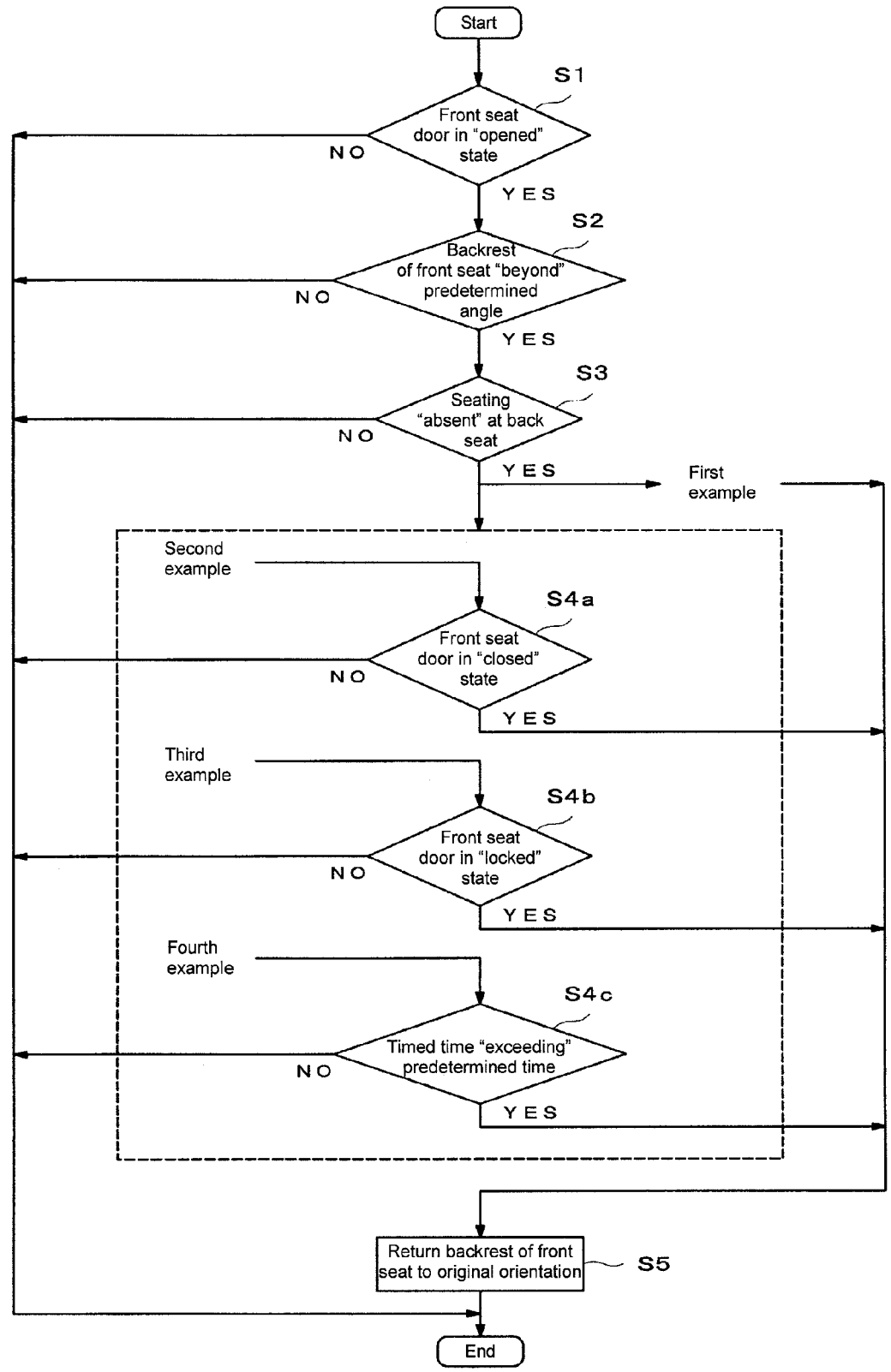
FIG. 6 is a flowchart showing an operation of the seat control device according to the embodiment of the present invention.

In FIG. 6, the first example is steps S1 to S3 and S5; and the second example is steps S1 to S3, S4a, and S5. The third example is steps S1 to S3, S4b, and S5; and the fourth example is steps S1 to S3, S4c, and S5. Thus, steps S1 to S3 and S5 are common in all of the first to fourth examples.

In step S1 of FIG. 6, whether or not the door for getting on and off to and from the front seat is in the opened sate is verified. Specifically, the opened/closed state of the door 23a (FIG. 4) for getting on and off to and from the seat 21a is detected by the open/close detection unit 13a (FIG. 4) under the control of the controller 11 (FIG. 4), where the process proceeds to step S2 if the opened state is detected (step S1: YES). If the opened state is not detected, that is, if the closed state is detected (step S1: NO), the seat control for this time is terminated to prepare for the next seat control.

In step S2, whether or not the backrest of the front seat is inclined beyond the allowable angle described above is verified. Specifically, the angle of the backrest 21m (FIG. 4) of the seat 21a is detected by the angle detection unit 15a (FIG. 4) under the control of the controller 11, and whether or not the backrest 21m is inclined in the V1 (FIG. 2) direction or the W1 (FIG. 2) direction beyond the forward allowable angle θ1 (FIG. 2) or the backward allowable angle θ2 (FIG. 2) is verified by the controller 11 based on the detection result. The process proceeds to step S3 if the backrest 21m is inclined beyond either one of the allowable angles as a result of the verification (step S2: YES), and if either allowable angle is exceeded (step S2: NO), the seat control for this time is terminated to prepare for the next seat control.

In step S3, whether seated at the back seat provided behind the front seat is verified. Specifically, the presence/absence of seating at the seat 21c provided behind the seat 21a is detected by the seating detection unit 18c (FIG. 4) under the control of the controller 11. The process proceeds to the step corresponding to the first to fourth examples if the absence of seating at the seat 21c is detected (step S3: YES) as a result of the detection, and if the absence of seating at the seat 21c is not detected, that is, the presence of seating is detected (step S3: NO), the seat control for this time is terminated to prepare for the next seat control.

Specifically, if the determination result of step S3 is YES, the process proceeds to step S5 in the first example and the process proceeds to step S4a in the second example. Similarly, the process proceeds to step S4b in the third example, and the process proceeds to step S4c in the fourth example.

In a case of the first example, the process directly proceeds to step S5, and the backrest of the front seat is returned to an original orientation. The original orientation in this case is the orientation of when the backrest is at the position of c1 (FIG. 2). Specifically, the drive control unit 17a (FIG. 4) is driven under the control of the controller 11, and the backrest 21m of the seat 21a in the angle range from the forward allowable angle θ1 to the forward limit angle θ11 (FIG. 2) or the angle range from the backward allowable angle θ2 to the backward limit angle θ12 (FIG. 2) is inclined to the position of c1. The backrest 21m is then returned to the original orientation. As soon as the return of the backrest 21m is completed, the seat control for this time is terminated to prepare for the next seat control.

In a case of the second example, whether or not the door for getting on and off to and from the front seat is in the closed state is verified in step S4a. Specifically, the opened/closed state of the door 23a for getting on and off to and from the seat 21a is detected by the open/close detection unit 13a under the control of the controller 11, where the process proceeds to step S5 if the closed state is detected (step S4a: YES), and the returning operation of the backrest 21m is performed. If the closed state is not detected, that is, if the opened state is detected (S4a: NO), the seat control for this time is terminated to prepare for the next seat control.

In a case of the third example, whether or not the door for getting on and off to and from the front seat is in the locked state is verified in step S4b. Specifically, the presence of lock of the door 23a for getting on and off to and from the front seat 21a is detected by the lock detection unit 14a (FIG. 4) under the control of the controller 11, where the process proceeds to step S5 if the locked state is detected (step S4b: YES), and the returning operation of the backrest 21m is performed. If the locked state is not detected, that is, if the unlocked state is detected (step S4b: NO), the seat control for this time is terminated to prepare for the next seat control.

In a case of the fourth example, timing is started in step S4c, and whether or not the timed time exceeds a predetermined time is verified. Specifically, the timing unit 20 (FIG. 4) starts timing based on the detection of the absence of seating at the seat 21c in the seating detection unit 18c, and terminates the timing based on the detection of the presence of seating. The process proceeds to step S5 if the timed time by the timing unit 20 exceeds the predetermined time (step S4c: YES), and the returning operation of the backrest 21m is performed. If the predetermined time is not exceeded (step S4c: NO), the seat control for this time is terminated to prepare for the next seat control.

Fifth to eighth examples of when inclining the backrest of the front seat will be described using a flowchart of FIG. 7.

Figure 7:
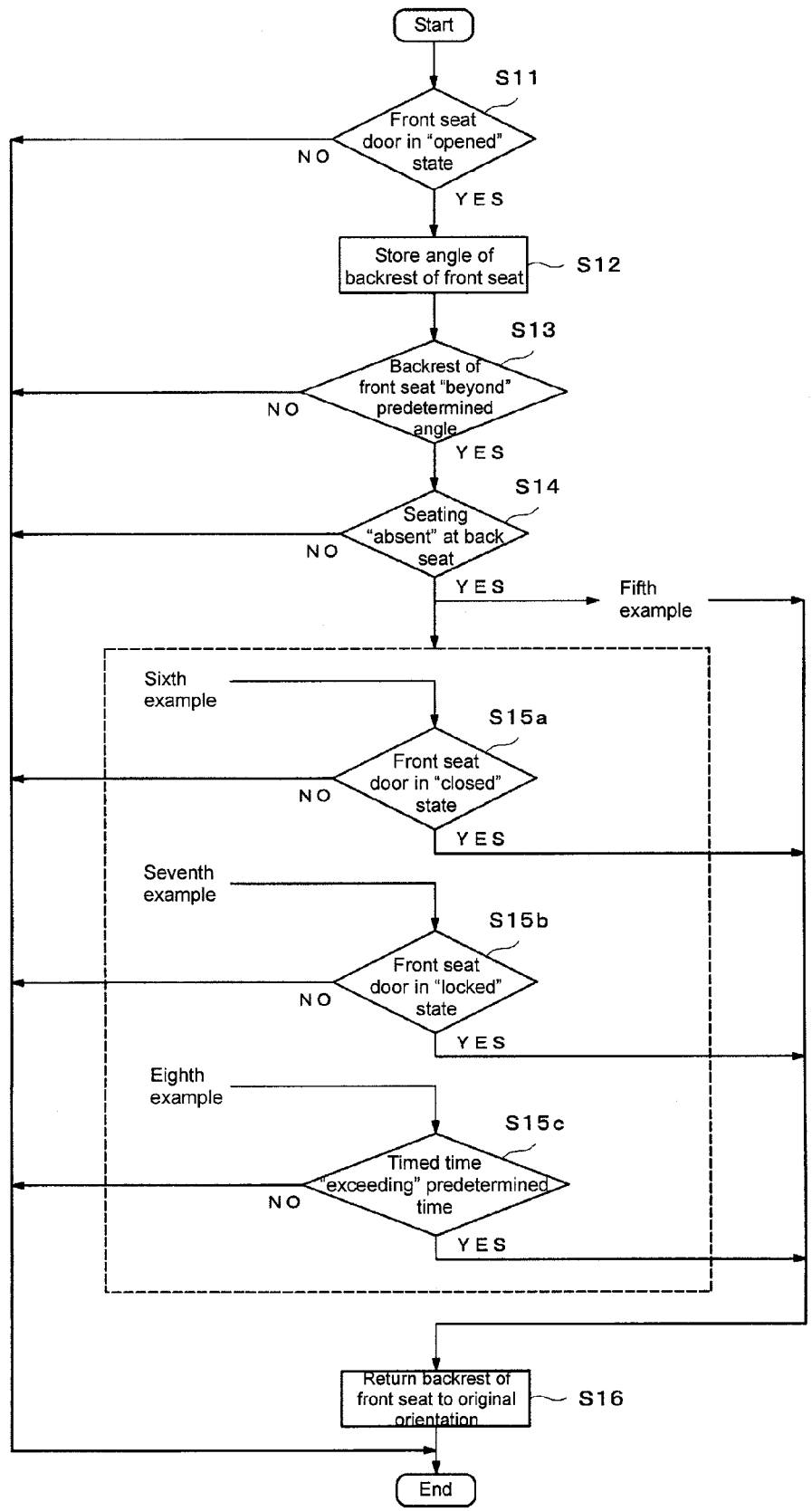
FIG. 7 is a flowchart showing an operation of the seat control device according to the embodiment of the present invention.

In FIG. 7, the fifth example is steps S11 to S14 and S16; and the sixth example is steps S11 to S14, S15a, and S16. The seventh example is steps S11 to S14, S15b, and S16; and the eighth example is steps S11 to S14, S15c, and S16. Thus, steps S11 to S14 and S16 are common in all of the fifth to eighth examples.

In step S11 of FIG. 7, the opened/closed state of the door 23a for getting on and off to and from the seat 21a is detected by the open/close detection unit 13a under the control of the controller 11, similar to step S1 of FIG. 6, where the process proceeds to step S12 if the opened state is detected (step S11: YES), and if the opened state is not detected, that is, if the closed state is detected (step S11: NO), the seat control for this time is terminated to prepare for the next seat control.

In step S12, the angle of the backrest of the front seat when the opened state of the door is detected in step S11 is stored. Specifically, when the opened state of the door 23a is detected by the open/close detection unit 13a, the angle of the backrest 21m is detected by the angle detection unit 15a under the control of the controller 11, and stored in the storage unit 19 (FIG. 4).

In step S13, the angle of the backrest 21m of the seat 21a is detected by the angle detection unit 15a under the control of the controller 11, and whether or not the backrest 21m is inclined in the V1 direction or the W1 direction beyond the forward allowable angle θ1 or the backward allowable angle θ2 is verified by the controller 11 based on the detection result, similar to step S2 of FIG. 6. The process proceeds to step S14 if the backrest 21m is inclined beyond either one of the allowable angles (step S13: YES) as a result of the verification, and if the backrest is inclined without exceeding either allowable angles (step S13: NO), the seat control for this time is terminated to prepare for the next seat control.

In step S14, the presence/absence of seating at the seat 21c is detected by the seating detection unit 18c under the control of the controller 11, similar to step S3 of FIG. 6. The process proceeds to the step corresponding to the fifth to eighth examples if the absence of seating at the seat 21c is detected (step S14: YES) as a result of the detection, and if the absence of seating at the seat 21c is not detected, that is, the presence of seating is detected (step S14: NO), the seat control for this time is terminated to prepare for the next seat control.

Specifically, if the determination result of step S14 is YES, the process proceeds to step S16 in the fifth example and the process proceeds to step S15a in the sixth example. Similarly, the process proceeds to step S15b in the seventh example, and the process proceeds to step S15c in the eighth example.

In a case of the fifth example, the process directly proceeds to step S16, and the backrest of the front seat is returned to the original orientation. The original orientation in this case is the orientation corresponding to the angle stored in the storage unit 19 in step S12. Specifically, the drive control unit 17a is driven under the control of the controller 11, and the backrest 21m of the seat 21a in the angle range from the forward allowable angle θ1 to the forward limit angle θ11 (FIG. 2) or the angle range from the backward allowable angle θ2 to the backward limit angle θ12 (FIG. 2) is inclined until the angle becomes equal to the angle stored in the storage unit 19. In this manner, the backrest 21m is returned to the original orientation. As soon as the return of the backrest 21m is completed, the seat control for this time is terminated to prepare for the next seat control.

In a case of the sixth example, the opened/closed state of the door 23a for getting on and off to and from the seat 21a is detected by the open/close detection unit 13a under the control of the controller 11 in step S15a, similar to step S4a of FIG. 6, where the process proceeds to step S16 if the closed state is detected (step S15a: YES), and the returning operation of the backrest 21m is performed. If the closed state is not detected, that is, if the opened state is detected (S15a: NO), the seat control for this time is terminated to prepare for the next seat control.

In a case of the seventh example, the presence of lock of the door 23a for getting on and off to and from the front seat 21a is detected by the lock detection unit 14a under the control of the controller 11 in step S15b, similar to step S4b of FIG. 6, where the process proceeds to step S16 if the locked state is detected (step S15b: YES), and the returning operation of the backrest 21m is performed. If the locked state is not detected, that is, if the unlocked state is detected (step S15b: NO), the seat control for this time is terminated to prepare for the next seat control.

In a case of the eighth example, the timing is started based on the detection of the absence of seating at the seat 21c in the seating detection unit 18c, and the timing is terminated based on the detection of the presence of seating in step S15c, similar to step S4c of FIG. 6. The process proceeds to step S16 if the timed time exceeds the predetermined time (step S15c: YES), and the returning operation of the backrest 21m is performed. If the predetermined time is not exceeded (step S15c: NO), the seat control for this time is terminated to prepare for the next seat control.

Therefore, in the embodiment described above, if the angle of the backrest 21m of the seat 21a is beyond a predetermined angle (θ1 or θ2) when the opened state of the door 23a is detected by the open/close detection unit 13a, the backrest 21m is returned to the original orientation based on the detection of the absence of seating at the seat 21c by the seating detection unit 18c. Thus, the backrest 21m can be automatically returned to the original orientation without requiring the operation by the passenger.

For example, when the backrest 21m of the front seat 21a is inclined towards the front side so that the passenger 22c of the back seat 21c can easily get off from the door 23a, the backrest 21m is automatically inclined backward and returned to the original orientation with the passenger 22c absent at the back seat 21c. Therefore, the backrest 21m does not hit the passenger 22c by the inclination of the backrest 21m towards the back side. Even if the backrest 21m of the front seat 21a is inclined backward to facilitate unloading of large baggage and the like from the door 23a, the backrest 21m is automatically inclined forward and returned to the original orientation. In this case, the person holding on to the backrest 21m may be frightened if the backrest 21m is inclined forward with infants and elderly at the back seat 21c holding on to the backrest 21m, but the person holding on to the backrest 21m will not be frightened since the backrest is inclined after checking that the passenger of the back seat 21c is absent by the seating detection unit 18c.

In the second example and the sixth example, when the absence of seating at the seat 21c is detected, whether or not the door 23a is in the closed state is further detected by the open/close detection unit 13a, and the backrest 21m is returned to the original orientation based on the detection of the closed state of the door 23a. Thus, the backrest 21m can be automatically returned to the original orientation at the time point the passenger of the seat 21c got off from the vehicle and the closed state of the door 23a is confirmed.

In the third example and the seventh example, when the absence of seating at the seat 21c is detected, whether or not the door 23a is locked is further detected by the lock detection unit 14a, and the backrest 21m is returned to the original orientation based on the detection of the lock of the door 23*a*. Thus, the backrest 21*m* can be automatically returned to the original orientation at the time point the passenger of the seat 21*c* got off from the vehicle and the locked state of the door 23*a* is confirmed.

In the fourth example and the eighth example, when the absence of seating at the seat 21*c* is detected, the timing by the timing unit 20 is started, and the backrest 21*m* is returned to the original orientation based on the timed time exceeding the predetermined time. Thus, the backrest 21*m* can be automatically returned to the original orientation at the time point the time necessary for the passenger of the seat 21*c* to get off from the vehicle after standing up from the seat has elapsed.

In the fifth example to the eighth example, the angle of the backrest 21*m* of the seat 21*a* when the opened state of the door 23*a* is detected by the open/close detection unit 13*a* is stored in the storage unit 19, and when the absence of seating at the seat 21*c* is detected, the backrest 21*m* is returned such that the angle of the backrest 21*m* becomes the angle stored in the storage unit 19. Thus, when the backrest 21*m* is returned to the original orientation, the angle of the backrest 21*m* becomes the same angle as the angle of when the door 23*a* is opened.

(2) When Horizontally Moving Front Seat

Next, ninth to twelfth examples of when horizontally moving the front seat will be described using a flowchart of FIG. 8.

Figure 8:
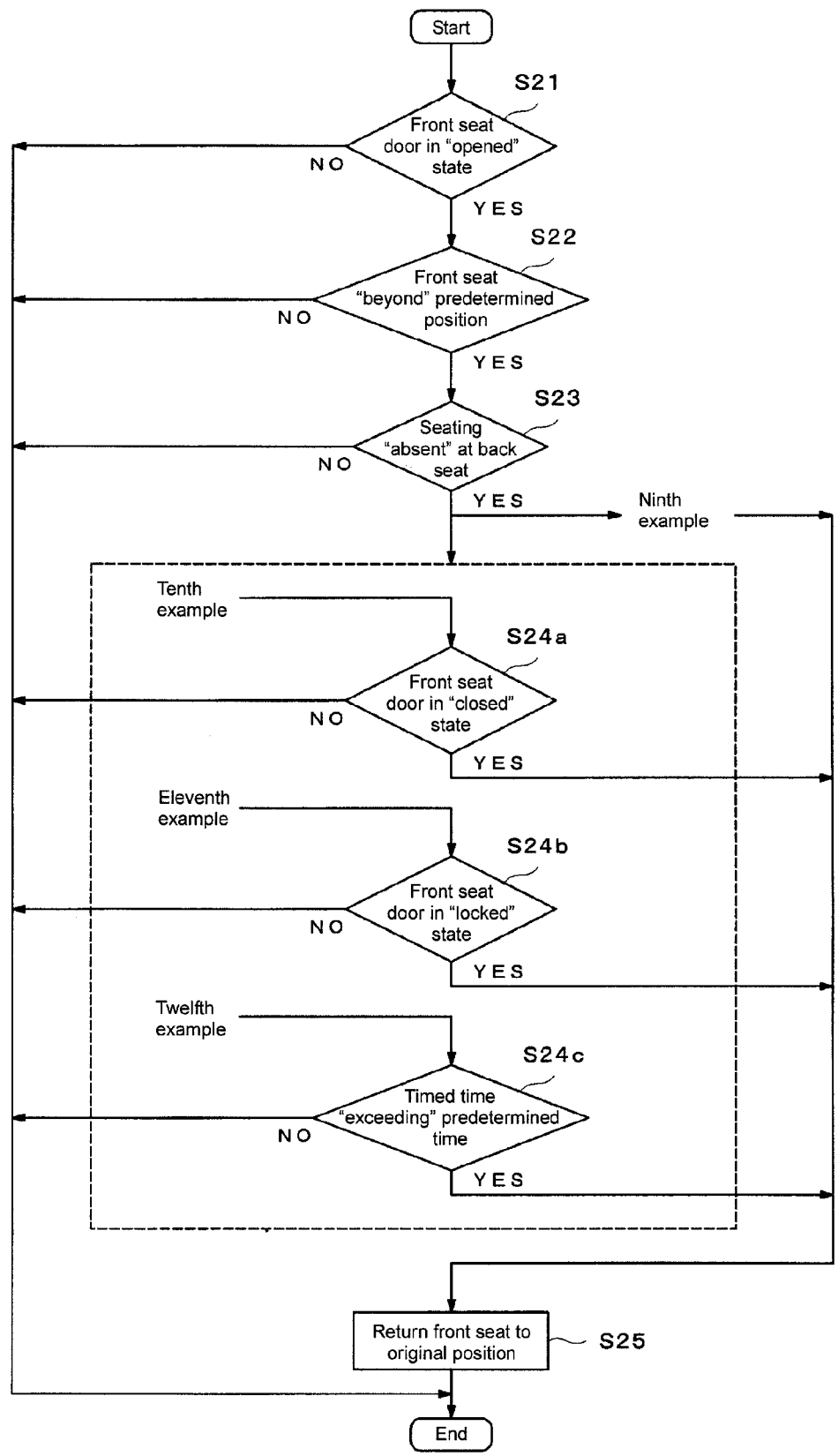
FIG. 8 is a flowchart showing an operation of the seat control device according to the embodiment of the present invention.

In FIG. 8, the ninth example is steps S21 to S23 and S25; and the tenth example is steps S21 to S23, S24*a*, and S25. The eleventh example is steps S21 to S23, S24*b*, and S25; and the twelfth example is steps S21 to S23, S24*c*, and S25. Thus, steps S21 to S23 and S25 are common in all of the ninth to twelfth examples.

In step S21 of FIG. 8, whether or not the door for getting on and off to and from the front seat is in the opened state is verified. Specifically, the opened/closed state of the door 23*a* for getting on and off to and from the seat 21*a* is detected by the open/close detection unit 13*a* under the control of the controller 11, where the process proceeds to step S22 if the opened state is detected (step S21: YES). If the opened state is not detected, that is, if the closed state is detected (step S21: NO), the seat control for this time is terminated to prepare for the next seat control.

In step S22, whether or not the front seat is moved beyond the allowable position described above is verified. Specifically, the position of the seat 21*a* is detected by the position detection unit 16*a* (FIG. 4) under the control of the controller 11, and whether or not the seat 21*a* is moved in the V2 (FIG. 3) direction or the W2 (FIG. 3) direction beyond the forward allowable position F3 (FIG. 3) or the backward allowable position B4 (FIG. 3) is verified by the controller 11 based on the detection result. The process proceeds to step S23 if the seat 21*a* is moved beyond either one of the allowable positions (step S22: YES) as a result of the verification, and if the position is not beyond either allowable positions (step S22: NO), the seat control for this time is terminated to prepare for the next seat control.

In step S23, whether seated at the back seat provided behind the front seat is verified. Specifically, the presence/absence of seating at the seat 21*c* is detected by the seating detection unit 18*c* under the control of the controller 11. The process proceeds to the step corresponding to the ninth to twelfth examples if the absence of seating at the seat 21*c* is detected (step S23: YES) as a result of the detection, and if the absence of seating at the seat 21*c* is not detected, that is, the presence of seating is detected (step S23: NO), the seat control for this time is terminated to prepare for the next seat control.

Specifically, if the determination result of step S23 is YES, the process proceeds to step S25 in the ninth example and the process proceeds to step S24*a* in the tenth example. Similarly, the process proceeds to step S24*b* in the eleventh example, and the process proceeds to step S24*c* in the twelfth example.

In a case of the ninth example, the process directly proceeds to step S25, and the front seat is returned to the original position. The original position in this case is the center position of C3 in FIG. 3. Specifically, the drive control unit 17*a* is driven under the control of the controller 11, and the seat 21*a* in the range from the forward allowable position F3 to the front end position F13 (FIG. 3) or the range from the backward allowable position B4 to the back end position B14 (FIG. 3) is moved to the center position C3. In this manner, the seat 21*a* is returned to the original position. As soon as the return of the seat 21*a* is completed, the seat control for this time is terminated to prepare for the next seat control.

In a case of the tenth example, whether or not the door for getting on and off to and from the front seat is in the closed state is verified in step S24*a*. Specifically, the opened/closed state of the door 23*a* for getting on and off to and from the seat 21*a* is detected by the open/close detection unit 13*a* under the control of the controller 11, where the process proceeds to step S25 if the closed state is detected (step S24*a*: YES), and the returning operation of the seat 21*a* is performed. If the closed state is not detected, that is, if the opened state is detected (S24*a*: NO), the seat control for this time is terminated to prepare for the next seat control.

In a case of the eleventh example, whether or not the door for getting on and off to and from the front seat is in the locked state is verified in step S24*b*. Specifically, the presence of lock of the door 23*a* for getting on and off to and from the front seat 21*a* is detected by the lock detection unit 14*a* under the control of the controller 11, where the process proceeds to step S25 if the locked state is detected (step S24*b*: YES), and the returning operation of the seat 21*a* is performed. If the locked state is not detected, that is, if the unlocked state is detected (step S24*b*: NO), the seat control for this time is terminated to prepare for the next seat control.

In a case of the twelfth example, the timing is started in step S24*c*, and whether or not the timed time exceeds a predetermined time is verified. Specifically, the timing unit 20 starts timing based on the detection of the absence of seating at the seat 21*c* in the seating detection unit 18*c*, and terminates the timing based on the detection of the presence of seating. The process proceeds to step S25 if the timed time by the timing unit 20 exceeds the predetermined time (step S24*c*: YES), and the returning operation of the seat 21*a* is performed. If the predetermined time is not exceeded (step S24*c*: NO), the seat control for this time is terminated to prepare for the next seat control.

Thirteenth to sixteenth examples of when horizontally moving the front seat will be described using a flowchart of FIG. 9.

Figure 9:
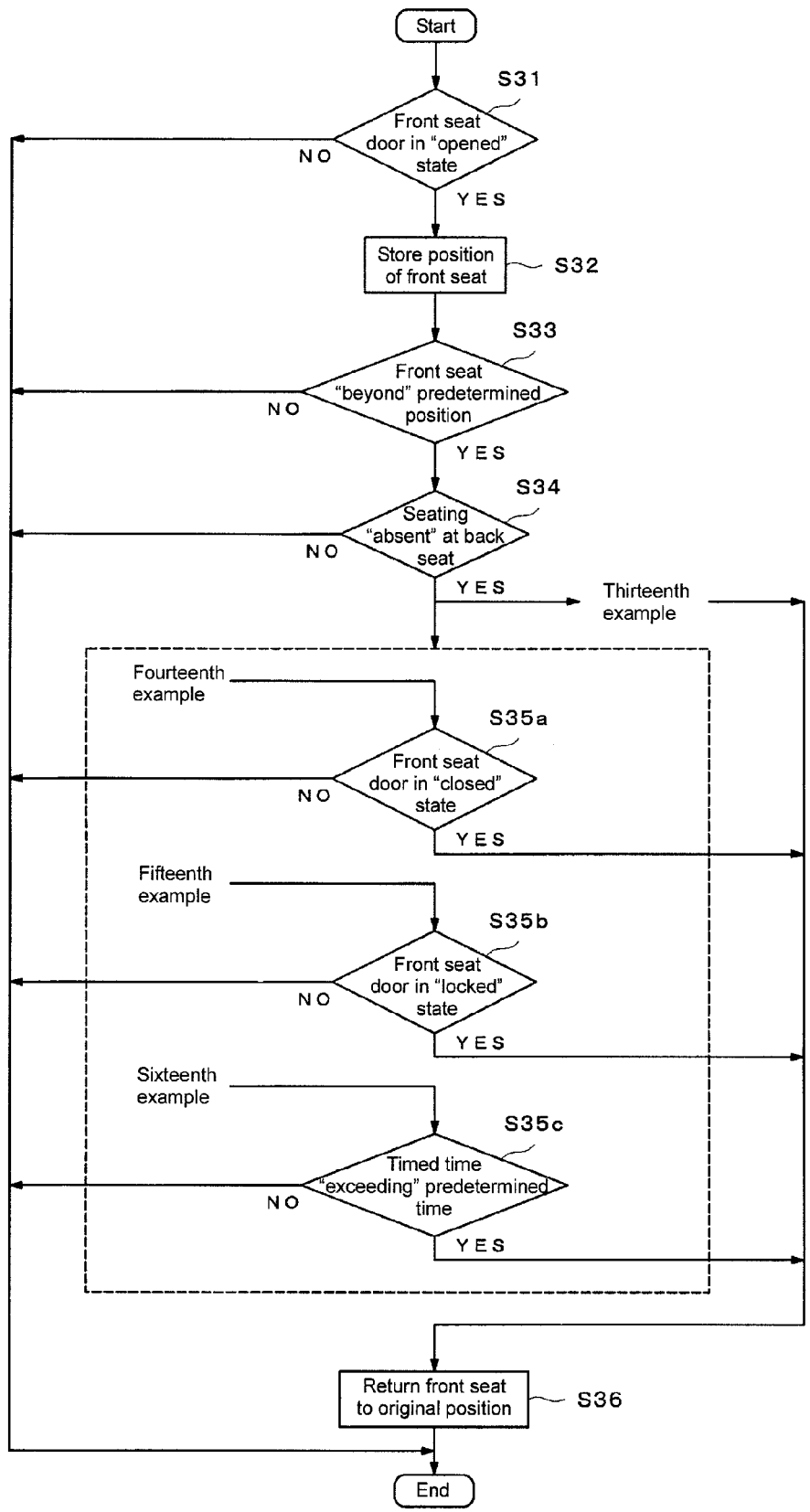
FIG. 9 is a flowchart showing an operation of the seat control device according to the embodiment of the present invention.

In FIG. 9, the thirteenth example is steps S31 to S34 and S36; and the fourteenth example is steps S31 to S34, S35*a*, and S36. The fifteenth example is steps S31 to S34, S35*b*, and S36; and the sixteenth example is steps S31 to S34, S35*c*, and S36. Thus, steps S31 to S34 and S36 are common in all of the thirteenth to sixteenth examples.

In step S31 of FIG. 9, the opened/closed state of the door 23*a* for getting on and off to and from the seat 21*a* is detected by the open/close detection unit 13*a* under the control of the controller 11, similar to step S21 of FIG. 8, where the process proceeds to step S32 if the opened state is detected (step S31: YES). If the opened state is not detected, that is, if the closed state is detected (step S31: NO), the seat control for this time is terminated to prepare for the next seat control.

In step S32, the position of the front seat when the opened state of the door is detected in step S31 is stored. Specifically, when the opened state of the door 23a is detected by the open/close detection unit 13a, the position of the seat 21a is detected by the position detection unit 16a under the control of the controller 11, and stored in the storage unit 19.

In step S33, the position of the seat 21a is detected by the position detection unit 16a under the control of the controller 11, and whether or not the seat 21a is moved in the V2 direction or the W2 direction beyond the forward allowable position F3 or the backward allowable position B4 is verified by the controller 11 based on the detection result, similar to step S22 of FIG. 8. The process proceeds to step S34 if the seat 21a is moved beyond either one of the allowable positions (step S33: YES) as a result of the verification, and if the position is not beyond either allowable position (step S33: NO), the seat control for this time is terminated to prepare for the next seat control.

In step S34, the presence/absence of seating at the seat 21c is detected by the seating detection unit 18c under the control of the controller 11, similar to step S23 of FIG. 8. The process proceeds to the step corresponding to the thirteenth to sixteenth examples if the absence of seating at the seat 21c is detected (step S34: YES) as a result of the detection, and if the absence of seating at the seat 21c is not detected, that is, the presence of seating is detected (step S34: NO), the seat control for this time is terminated to prepare for the next seat control.

Specifically, if the determination result of step S34 is YES, the process proceeds to step S36 in the thirteenth example and the process proceeds to step S35a in the fourteenth example. Similarly, the process proceeds to step S35b in the fifteenth example, and the process proceeds to step S35c in the sixteenth example.

In a case of the thirteenth example, the process directly proceeds to step S36, and the front seat is returned to the original position. The original position in this case is the position stored in the storage unit 19 in step S32. Specifically, the drive control unit 17a is driven under the control of the controller 11, and the seat 21a in the range from the forward allowable position F3 to the front end position F13 or the range from the backward allowable position B4 to the back end position B14 is moved to the position stored in the storage unit 19. In this manner, the seat 21a is returned to the original position. As soon as the return of the seat 21a is completed, the seat control for this time is terminated to prepare for the next seat control.

In a case of the fourteenth example, the opened/closed state of the door 23a for getting on and off to and from the seat 21a is detected by the open/close detection unit 13a under the control of the controller 11 in step S35a, similar to step S24a of FIG. 8, where the process proceeds to step S36 if the closed state is detected (step S35a: YES), and the returning operation of the seat 21a is performed. If the closed state is not detected, that is, if the opened state is detected (S35a: NO), the seat control for this time is terminated to prepare for the next seat control.

In a case of the fifteenth example, the presence of lock of the door 23a for getting on and off to and from the seat 21a is detected by the lock detection unit 14a under the control of the controller 11 in step S35b, similar to step S24b of FIG. 8, where the process proceeds to step S36 if the locked state is detected (step S35b: YES), and the returning operation of the seat 21a is performed. If the locked state is not detected, that is, if the unlocked state is detected (step S35b: NO), the seat control for this time is terminated to prepare for the next seat control.

In a case of the sixteenth example, the timing is started based on the detection of the absence of seating at the seat 21c in the seating detection unit 18c, and the timing is terminated based on the detection of the presence of seating in step S35c, similar to step S24c of FIG. 8. The process proceeds to step S36 if the timed time by the timing unit 20 exceeds the predetermined time (step S35c: YES), and the returning operation of the seat 21a is performed. If the predetermined time is not exceeded (step S35c: NO), the seat control for this time is terminated to prepare for the next seat control.

Therefore, in the embodiment described above, if the position of the seat 21a is beyond a predetermined position (F3 or B4) when the opened state of the door 23a is detected by the open/close detection unit 13a, the seat 21a is returned to the original position based on the detection of the absence of seating at the seat 21c by the seating detection unit 18c. Thus, the seat 21a can be automatically returned to the original position without requiring the operation by the passenger.

For example, when the front seat 21a is moved forward so that the passenger 22c of the back seat 21c can easily get off from the door 23a, the seat 21a is automatically moved backward and returned to the original position with the passenger 22c absent at the back seat 21c. Therefore, the backrest 21m does not hit the passenger 22c by the movement of the seat 21a towards the back side. Even if the front seat 21a is moved backward to facilitate unloading of large baggage and the like from the door 23a, the seat 21a is automatically moved forward and returned to the original position. In this case, the person holding on to the backrest 21m may be frightened if the seat 21a is moved forward with infants and elderly at the back seat 21c holding on to the backrest 21m of the seat 21a, but the person holding on to the backrest 21m will not be frightened since the seat is moved after checking that the passenger of the back seat 21c is absent by the seating detection unit 18c.

In the tenth example and the fourteenth example, when the absence of seating at the seat 21c is detected, whether or not the door 23a is in the closed state is further detected by the open/close detection unit 13a, and the seat 21a is returned to the original position based on the detection of the closed state of the door 23a. Thus, the seat 21a can be automatically returned to the original position at the time point the passenger of the seat 21c got off from the vehicle and the closed state of the door 23a is confirmed.

In the eleventh example and the fifteenth example, when the absence of seating at the seat 21c is detected, whether or not the door 23a is locked is further detected by the lock detection unit 14a, and the seat 21a is returned to the original position based on the detection of the lock of the door 23a. Thus, the seat 21a can be automatically returned to the original position at the time point the passenger of the seat 21c got off from the vehicle and the locked state of the door 23a is confirmed.

In the twelfth example and the sixteenth example, when the absence of seating at the seat 21c is detected, the timing by the timing unit 20 is started, and the seat 21a is returned to the original position based on the timed time exceeding the predetermined time. Thus, the seat 21a can be automatically returned to the original position at the time point the time necessary for the passenger of the seat 21c to get off from the vehicle after standing up from the seat has elapsed.

In the thirteenth example to the sixteenth example, the position of the seat 21a when the opened state of the door 23a is detected by the open/close detection unit 13a is stored in the storage unit 19, and when the absence of seating at the seat 21c is detected, the seat 21a is returned to the position stored in the storage unit 19. Thus, when the seat 21a is returned to the original position, the position of the seat 21a becomes the same position of when the door 23a is opened.

In the present invention, various embodiments other than the above can be adopted. For example, in the above-described embodiment, the seat control device 100 is applied to the vehicle 200 such as an automobile and the like, but the present invention is not limited thereto, and application can be made to railroad vehicles, ships, and other carriages.

In the above-described embodiment, the vehicle 200 is a two-row seat vehicle, but the present invention is not limited thereto, and application can be made to a vehicle having two or more rows of seats, and the seat control may be performed at each seat in the front-back relationship.

Moreover, in the above-described embodiment, whether or not the backrest 21m of the seat 21a is inclined beyond the forward allowable angle θ1 or the backward allowable angle θ2 is verified in the first to eighth examples, and whether or not the seat 21a is moved beyond the forward allowable position F3 or the backward allowable position B4 is verified in the ninth to sixteenth examples, but the present invention is not limited thereto, and the angle of the backrest 21m and the position of the seat 21a may be simultaneously verified.

Further, in the above-described embodiment, the angle of the backrest 21m at the time of detection is stored in the storage unit 19 when the opened state of the door 23a is detected by the open/close detection unit 13a in the sixth to eighth examples, and the position of the seat 21a at the time of detection is stored in the storage unit 19 when the opened state of the door 23a is detected by the open/close detection unit 13a in the fourteenth to sixteenth examples. However, the present invention is not limited thereto, and the angle of the backrest or the position of the seat at the same seat may be stored for a plurality of passengers in the storage unit 19 by separately arranging a store button (not shown), and the like.

What is claimed is:

1. A seat control device comprising:
    an input unit for performing at least one of an operation to incline and move a first seat; and
    a drive control unit for at least one of inclining and moving the first seat based on an output of the input unit;
    the seat control device comprising:
        an open/close detection unit for detecting an opened or closed state of a door for getting on and off to and from the first seat;
        an angle detection unit for detecting an angle of a backrest of the first seat; and
        a seating detection unit for detecting presence/absence of seating at a second seat positioned behind the first seat;
    wherein when the open/close detection unit detects that the door is in the opened state, the angle detection unit detects an angle of a backrest of the first seat,
    wherein when the detected angle is larger than a predetermined angle, the seating detection unit detects the presence or absence of seating at the second seat, and
    wherein the drive control unit is driven based on the detection of absence of seating to return the backrest of the first seat to an original orientation.

2. The seat control device according to claim 1,
    wherein when the seating detection unit detects absence of seating, the open/close detection unit detects whether the door is closed, and the drive control unit is driven based on the detection of the closed state of the door to return the backrest of the first seat to the original orientation.

3. The seat control device according to claim 1, further comprising:
    a lock detection unit for detecting presence or absence of lock of the door;
    wherein when the seating detection unit detects absence of seating, the lock detection unit detects whether the door is locked, and the drive control unit is driven based on the detection of the lock of the door to return the backrest of the first seat to the original orientation.

4. The seat control device according to claim 1, further comprising:
    a timing unit for timing time;
    wherein when the seating detection unit detects absence of seating, timing by the timing unit is started, and the drive control unit is driven based on the time timed by the timing unit exceeding a predetermined time to return the backrest of the first seat to the original orientation.

5. The seat control device according to claim 1, further comprising:
    a storage unit for storing the angle of the backrest of the first seat when the open/close detection unit detects that the door is in the opened state;
    wherein when returning the backrest of the first seat to the original orientation, the backrest is returned so that the angle of the backrest of the first seat becomes the angle stored in the storage unit.

6. The seat control device according to claim 1, further comprising:
    a position detection unit for detecting a horizontal position of the first seat in place of the angle detection unit;
    wherein when the open/close detection unit detects that the door is in the opened state, the position detection unit detects a horizontal position of the first seat, and
    wherein when the detected position is beyond a predetermined position, the seating detection unit detects the presence or absence of seating at the second seat, and the drive control unit is driven based on the detection of absence of seating to return the first seat to an original position.

7. The seat control device according to claim 6,
    wherein when the seating detection unit detects absence of seating, the open/close detection unit detects whether the door is in the closed state, and the drive control unit is driven based on the detection of the closed state of the door to return the first seat to the original position.

8. The seat control device according to claim 6, further comprising:
    a lock detection unit for detecting presence or absence of lock of the door;
    wherein when the seating detection unit detects absence of seating, the lock detection unit detects whether the door is locked, and the drive control unit is driven based on the detection of the lock of the door to return the first seat to the original position.

9. The seat control device according to claim 6, further comprising:
    a timing unit for timing time;
    wherein when the seating detection unit detects absence of seating, timing by the timing unit is started, and the drive control unit is driven based on the time timed by the timing unit exceeding a predetermined time to return the first seat to the original position.

10. The seat control device according to claim 6, further comprising:
- a storage unit for storing a horizontal position of the first seat when the open/close detection unit detects that the door is in the opened state;
- wherein when returning the first seat to the original position, the first seat is returned to the position stored in the storage unit.

11. The seat control device according to claim 2, further comprising:
- a storage unit for storing the angle of the backrest of the first seat when the open/close detection unit detects that the door is in the opened state;
- wherein when returning the backrest of the first seat to the original orientation, the backrest is returned so that the angle of the backrest of the first seat becomes the angle stored in the storage unit.

12. The seat control device according to claim 3, further comprising:
- a storage unit for storing the angle of the backrest of the first seat when the open/close detection unit detects that the door is in the opened state;
- wherein when returning the backrest of the first seat to the original orientation, the backrest is returned so that the angle of the backrest of the first seat becomes the angle stored in the storage unit.

13. The seat control device according to claim 4, further comprising:
- a storage unit for storing the angle of the backrest of the first seat when the open/close detection unit detects that the door is in the opened state;
- wherein when returning the backrest of the first seat to the original orientation, the backrest is returned so that the angle of the backrest of the first seat becomes the angle stored in the storage unit.

14. The seat control device according to claim 7, further comprising:
- a storage unit for storing a horizontal position of the first seat when the open/close detection unit detects that the door is in the opened state;
- wherein when returning the first seat to the original position, the first seat is returned to the position stored in the storage unit.

15. The seat control device according to claim 8, further comprising:
- a storage unit for storing a horizontal position of the first seat when the open/close detection unit detects that the door is in the opened state;
- wherein when returning the first seat to the original position, the first seat is returned to the position stored in the storage unit.

16. The seat control device according to claim 9, further comprising:
- a storage unit for storing a horizontal position of the first seat when the open/close detection unit detects that the door is in the opened state;
- wherein when returning the first seat to the original position, the first seat is returned to the position stored in the storage unit.

* * * * *